(12) United States Patent
Chalabi et al.

(10) Patent No.: US 8,845,777 B2
(45) Date of Patent: Sep. 30, 2014

(54) METAL RECOVERY FROM CONTAMINATED METAL SCRAP

(75) Inventors: Rifat Al Chalabi, Nottingham (GB); Ophneil Henry Perry, Nottingham (GB)

(73) Assignee: Chinook Sciences, Ltd., Nottingham (GB)

( * ) Notice: Subject to any disclaimer, the term of this patent is extended or adjusted under 35 U.S.C. 154(b) by 0 days.

(21) Appl. No.: 13/578,399

(22) PCT Filed: Feb. 4, 2011

(86) PCT No.: PCT/GB2011/000140
§ 371 (c)(1),
(2), (4) Date: Sep. 20, 2012

(87) PCT Pub. No.: WO2011/098750
PCT Pub. Date: Aug. 18, 2011

(65) Prior Publication Data
US 2013/0199338 A1 Aug. 8, 2013

(30) Foreign Application Priority Data

Feb. 11, 2010 (GB) .................................. 1002299.4

(51) Int. Cl.
| | |
|---|---|
| *C22B 21/06* | (2006.01) |
| *F27D 17/00* | (2006.01) |
| *C22B 7/00* | (2006.01) |
| *C22B 21/00* | (2006.01) |
| *C22B 1/00* | (2006.01) |

(52) U.S. Cl.
CPC .......... *C22B 21/0007* (2013.01); *F27D 17/001* (2013.01); *C22B 7/003* (2013.01); *C22B 21/0069* (2013.01); *F27D 17/004* (2013.01); *C22B 1/005* (2013.01)

USPC .............................................. 75/403; 75/687

(58) Field of Classification Search
USPC ...................................................... 75/403, 687
See application file for complete search history.

(56) References Cited

U.S. PATENT DOCUMENTS 5,122,181 A * 6/1992 Dube et al. .................... 75/10.21
5,540,752 A * 7/1996 Spoel ............................. 75/380
(Continued)

FOREIGN PATENT DOCUMENTS

| CN | 1171451 | 1/1998 |
|---|---|---|
| CN | 1246895 | 3/2000 |

(Continued)

OTHER PUBLICATIONS

English translation of the Text of the First Office Action. Application No. 2011800179961. Jul. 16, 2013.
(Continued)

*Primary Examiner* — George Wyszomierski
*Assistant Examiner* — Tima M McGuthry Banks
(74) *Attorney, Agent, or Firm* — Stetina Brunda Garred & Brucker

(57) ABSTRACT

A metal reclaiming system and method for reclaiming metal from scrap material is provided. The system has a furnace (12) and a controller (106) for controlling operation of the system. The controller (106) operates the metal reclaiming system in a first operating mode in which the furnace (12) is operated at a first temperature in the range of 350° C. to 550° C. to incinerate pollutants and drive off volatile organic compounds (VOCs) from the scrap material without melting the metal. The controller (106) is operates the metal reclaiming system in a subsequent operating mode in which the furnace (12) is operated at a further, higher temperature to melt metal in the said scrap for reclaiming.

25 Claims, 6 Drawing Sheets

(56) References Cited

U.S. PATENT DOCUMENTS

| | | | |
|---|---|---|---|
| 7,655,067 B2 * | 2/2010 | Lucas et al. | 75/678 |
| 2009/0218736 A1 * | 9/2009 | Lodin et al. | 266/44 |

FOREIGN PATENT DOCUMENTS

| | | |
|---|---|---|
| CN | 1505689 | 6/2004 |
| CN | 101184968 | 5/2008 |
| WO | 8700259 | 1/1987 |
| WO | 9515404 | 6/1995 |
| WO | 0198092 | 12/2001 |

OTHER PUBLICATIONS

Examination Report Under Section 18(3) in relation to Application No. GB1002299.4 dated Feb. 3, 2011; 3 pages.

State Intellecutal Property Office of People'S Republic of China, Office Action, Apr. 22, 2014 (with English translation).

* cited by examiner

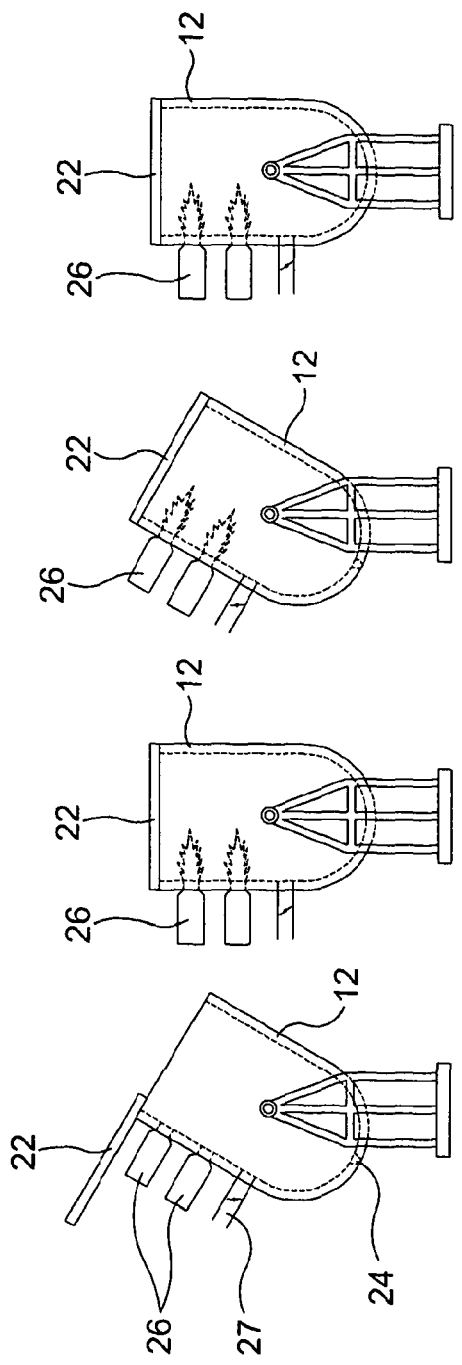
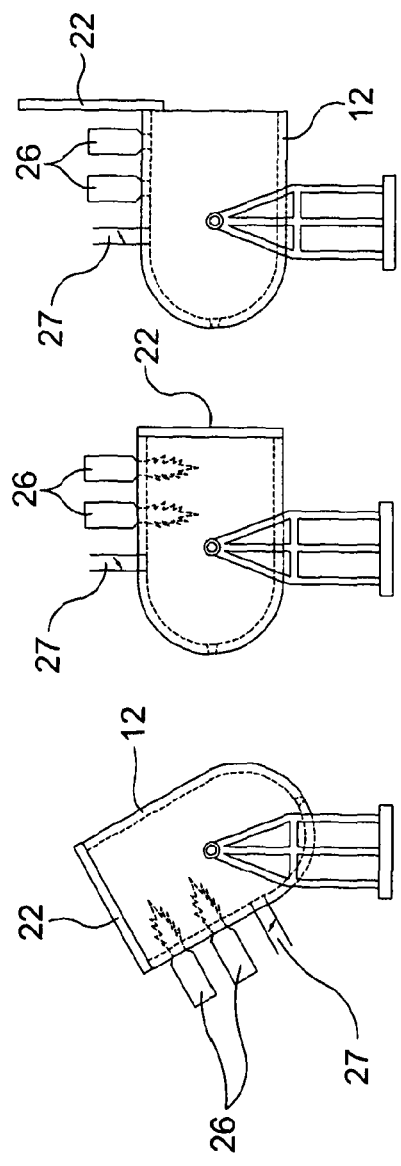

METAL RECOVERY FROM CONTAMINATED METAL SCRAP

FIELD OF THE INVENTION

This invention relates to apparatus and a method for reclaiming metal.

BACKGROUND OF THE INVENTION

There is an increasing requirement to recycle materials such as aluminium, magnesium and other metals and non-metals. Often such materials will be coated in paint, oil, water, lacquers, plastics, or other volatile organic compounds (VOCs) which must be removed prior to re-melting the materials. For materials which are capable of being processed at relatively high temperatures without melting, such impurities are typically removed using a thermal process which is sometimes known as de-coating. Such thermal de-coating processes can also be used to dry and/or sterilise materials prior to remelting.

For example, aluminium is often used in the production of beverage cans which are typically coated in paint, lacquers and/or other VOCs, and also in larger products such as internal combustion scrap. Before the aluminium can be melted down for recycling, any coatings or other impurities must be removed in order to minimise metal loss and the aluminium separated from other metals.

Known de-coating processes involve exposing the material to be treated to hot gases in order to oxidise the coatings and/or impurities which are to be removed. This exposure takes place in a closed environment in which the temperature and oxygen content of the hot gases can be controlled. Temperatures in excess of 300 C are required to remove most organic compounds and an oxygen level in the range of 6% to 12% is normally required.

If the temperature and oxygen levels of the hot gases are not carefully controlled the process can go autothermic as the VOCs which are released during the thermal stripping are combusted. This can result in an uncontrolled increase in the temperature of the hot gases which may be very dangerous.

The material will usually be shredded before treatment and it is important for effective de-coating that all the surfaces of the shredded material are exposed to the hot gases, If this does not occur then the treatment becomes less effective and, in the case of U.B.C.s in particular, a black stain may be left on the surface of the treated material. It is also desirable for the material to be agitated during the treatment to physically remove lose coatings or impurities from the material.

At present the main systems which are used for thermal de-coating and metal recovery are:

1 Static Oven

In a static oven, the material is stacked on a wire mesh and hot gases are recirculated through the oven to heat the material to the required process temperature.

This arrangement is not efficient because the hot gases do not come in to contact with the materials that are enclosed within the stack of materials on the mesh. As discussed previously, it is important in de-coating that all the surfaces of the materials being treated are exposed to the hot gases. Also there is no agitation of the material being treated.

2 Conveying Oven

This system uses a mesh belt conveyor to transport materials for treatment through an oven. Hot gasses are passed through the material on the belt as it passes through the oven. The problems with this method are as follows:

The depth of materials on the belt limits the process. The materials are stacked, causing similar problems to those found with the static oven in which materials at the centre of the stack do not come into contact with the hot gases There is no agitation of the materials, so loose coatings are not removed.

The conveyor belt life is short.

The materials have to be constantly fed.

The process is not suitable for low volume or continuously changing product.

3 Rotating Kiln

A large kiln is inclined to the horizontal so that material fed or charged into the kiln at its highest end travels towards the lowest end, where it is discharged, under the influence of gravity. The kiln is rotated so that material within the kiln is agitated and a flow of hot gases is provided to heat up the material as it travels through the kiln. A number of problems are associated with this method:

The material has to be constantly fed.

The process is not suitable for low volume or continuously changing product.

The continuous process requires air locks at both ends, materials charge end and materials discharge end.

The kiln requires a rotating seal leading to a high level of maintenance.

4 Sloping Hearth Furnace

This is used for reclaiming metal such as aluminium from scrap and the like. A dross furnace is provided with one or more tap holes or a full width slot so sized as to permit the passage of molten metal into a reservoir while retaining the resulting waste material. The dross furnace has a sloping hearth on which the scrap are loaded and the resulting molten aluminium drains into the reservoir. The angle of the sloping hearth is critical and dust and sand from the scrap can contaminate the metal.

WO 01/98092 A1 describes a pivotable or tiltable oven that overcomes many of the disadvantages of the previously known apparatus and methods for thermal de-coating. For a detailed description of the construction and operation of the oven, the reader should refer to WO 01/98092 A1. However, briefly, the oven has a charging portion for receiving material to be treated and a changeover portion. Incorporated within the changeover portion is a heat treatment chamber through which a stream or flow of hot gasses can be passed. The oven is pivotally moveable between a first position in which the changeover portion is higher than the charging portion and a second position in which the charging portion is higher than the changeover portion. The arrangement is such that the oven can be repeatedly moved between the first and second positions so that material within the oven falls from one portion to the other portion, passing through the stream of hot gasses in the heat treatment chamber. A method of using the apparatus is also disclosed.

The above known oven has the advantage that it can be used to treat comparatively low volumes of material in a batch process. A further advantage is that by controlling the movement of the oven, the material being treated can be brought into and out of the heat treatment chamber at will, enabling the oven to be operated safely without the process going autothermic in an uncontrolled manner and allowing a very fine degree of control of the treatment process.

The oven described in WO 01/98092 A1 has been found to work well, providing a commercially and technically acceptable means of thermally de-coating relatively low volumes of materials. However, when treating light weight materials, such as powders or materials that have been shredded into very small pieces, there can be a tendency for some of the material being treated to become entrained in the flow of hot gasses passing through the heat treatment chamber. Whilst some of the entrained material can be filtered out of the gas flow and recollected, there is an overall reduction in the efficiency of the process.

It is an object of the present invention is to provide an improved apparatus for reclaiming aluminium from scrap or waste material and the like.

SUMMARY OF THE INVENTION

Accordingly, the present invention provides a metal reclaiming system for reclaiming metal from scrap material and the like, the system comprising: a furnace; and a controller (106) for controlling operation of the system; wherein the controller is configured to operate the metal reclaiming system in: a first operating mode in which the furnace is operated at a first temperature in the range of 350° C. to 550° C. to incinerate pollutants and drive off volatile organic compounds (VOC's) from the scrap material without melting the metal; and a subsequent operating mode in which the furnace is operated at a second, higher temperature to melt metal in the said scrap for reclaiming.

Various optional features of preferred embodiments of the system of the invention are set out in each of the paragraphs below.

The preferred system has a thermal oxidiser coupled to said furnace to process raw VOC's and a return path from said thermal oxidiser to return heat from processing said VOC's in said thermal oxidiser to said furnace.

Said thermal oxidiser has a burner with a fuel input configured to receive said VOC's from said furnace as a fuel source.

Said return path comprises a gaseous return path to return heated gas from said thermal oxidiser to said furnace and wherein said return path includes a gas conditioner to perform one or more of: cooling said heated gas, cleaning said heated gas of particulates and cleaning said heated gas of acid.

The system has an air pollution control unit and a gaseous exit passage from said thermal oxidiser to said air pollution control unit, wherein said air pollution control unit is configured to perform one or more of the following: cooling exit gas from said thermal oxidiser, cleaning said exit gas of particulates and cleaning said exit gas of acid.

The system has a controller for controlling a temperature of the furnace and means coupled to said controller to monitor a composition of gas provided from said furnace to said thermal oxidiser and a composition of gas returned from said thermal oxidiser to said furnace, and wherein said controller is configured to identify a finish time of one or more of said operating modes in dependence on said monitored compositions.

The system has a system to flow gas through said furnace prior to operation in said further mode of operation to clean said furnace of particulates.

The system has a gas flow route for capturing particulates entrained in gas exiting said furnace during said cleaning of said furnace.

Said furnace is tiltable for one or more of loading, discharge and agitation of the furnace.

Said scrap includes a first type of metal melting at said second temperature and a second type of metal unmelted at said second temperature, wherein said system has a third operating mode in which said furnace is operated at a third temperature, higher than said second temperature, after melting and reclaiming said first metal, to thermally condition the second metal to facilitate crushing of said second metal.

Said reclaimed metal comprises aluminium

The present invention also provides a method of reclaiming aluminium from scrap material or the like, the method comprising: loading said scrap into a tiltable furnace; operating said furnace in a first mode by heating said scrap in said furnace at a first temperature in the range of 350° C. to 550° C. to drive off VOC's without melting the aluminium; operating said furnace in a subsequent mode by raising a temperature of the furnace to melt said aluminium; and tilting said furnace to allow molten aluminium to escape through a discharge port.

Various optional features of preferred embodiments of the method of the invention are set out in each of the paragraphs below.

The preferred method further comprises raising the temperature of the furnace to a high temperature after removal of said molten aluminium to thermally condition metal remaining in the furnace.

The furnace is tilted back and forth to agitate the scrap.

Said furnace is tilted to discharge said thermally conditioned metal.

Raw VOC's are processed in a thermal oxidiser and processed, heated gases are returned from said thermal oxidiser to said furnace to assist heating the furnace.

VOC's from said furnace are fed to said thermal oxidiser as a fuel source.

One or more of the following operations are performed on said returned heated gases: cooling said heated gas, cleaning said heated gas of particulates and cleaning said heated gas of acid.

A composition of gas provided from said furnace to said thermal oxidiser and a composition of gas returned from said thermal oxidiser to said furnace are monitored, and the finish time of one or more of said operating modes is determined in dependence on said monitored compositions.

Gas is flowed through said furnace prior to operation in said further mode of operation to clean said furnace of particulates.

Particulates entrained in gas exiting said furnace during said cleaning of said furnace are captured.

Said furnace is tilted for one or more of loading, discharge and agitation of the furnace.

In one preferred method, said scrap includes a first type of metal melting at said second temperature and a second type of metal unmelted at said second temperature, and the method further comprises operating said furnace at a third operating mode in which said furnace is operated at a third temperature, higher than said second temperature, after melting and reclaiming said first metal, to thermally condition the second metal thereby to facilitate crushing of said second metal.

Said reclaimed metal preferably comprises aluminium

The present invention further comprises apparatus for reclaiming aluminium from scrap or the like, the apparatus comprising: a tiltable furnace having a material entry point for loading said scrap; means for heating said scrap in said furnace at a first temperature to drive off VOC's; means for raising a temperature of the furnace to melt said aluminium; means for tilting said furnace to allow molten aluminium to escape through a discharge port.

The present invention is further described hereinafter, by way of example, with reference to the accompanying drawings, in which:

FIG. 1 is a schematic view of a preferred system according to the present invention;

FIG. 2*a* is a graph showing the variation of temperature with time during the operating modes of the system of FIG. 1;

FIGS. 4A to 4G show various positions which the furnace adopts during operation.

Figure 1:
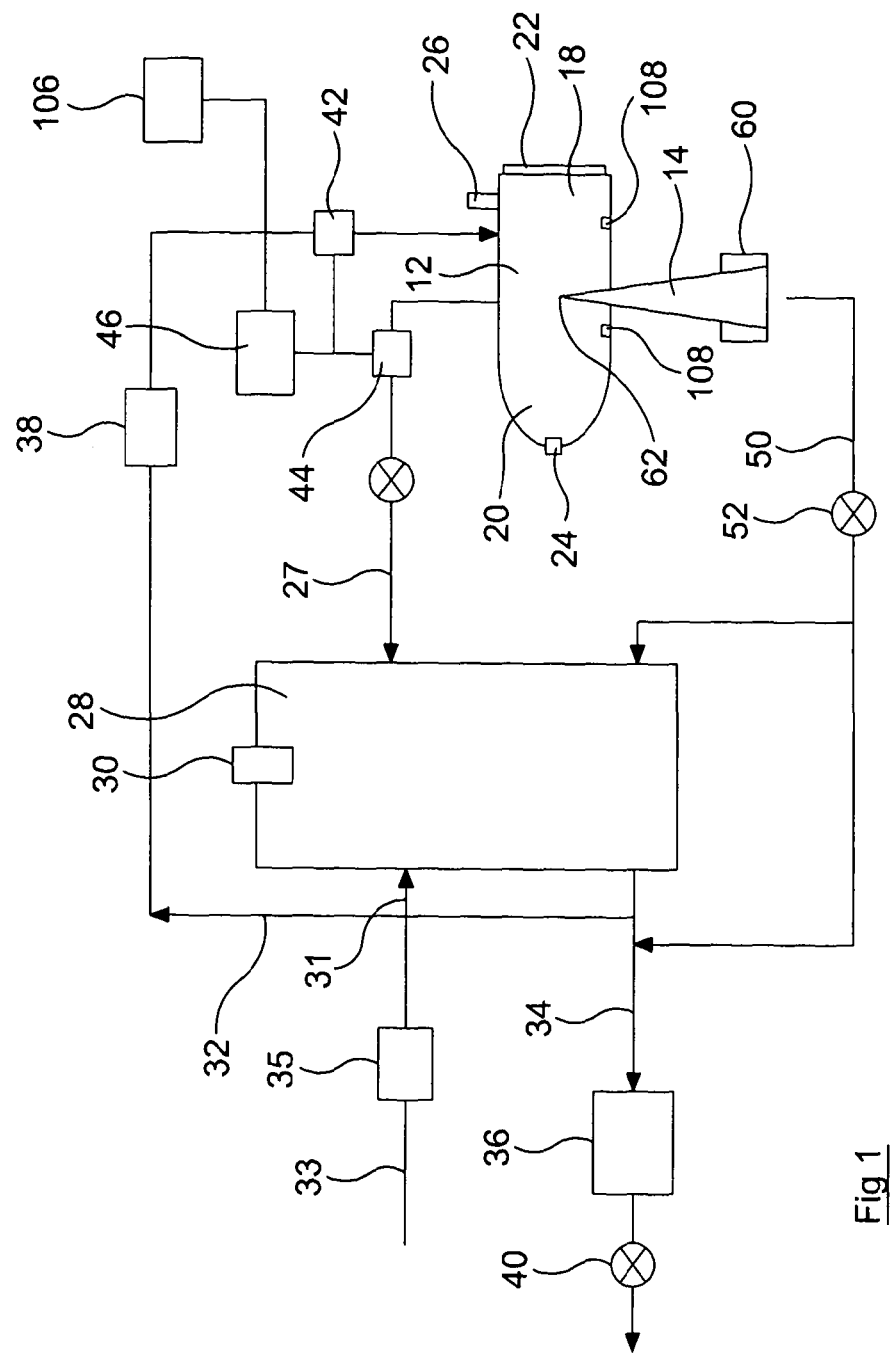

Referring to the drawings, these show a system 10 for use in recovering metals from scrap or waste material. Although the apparatus is applicable to the recovery of various metals from waste material it is described here in its preferred form in relation to the recovery of aluminium from metal scrap where the metal scrap is in large pieces such as iron or steel castings.

The system has a furnace 12 which is supported for pivotal movement on a pivot support 14 and a drive mechanism 60 that is used to pivot the furnace about a generally horizontal pivot axis 62. The furnace 12 has a body portion 16, a material entry point 18 and a discharge portion 20. The entry point 18 has a door 22 which is preferably, though not essentially, an airtight door which may be provided with flu ducting to carry away waste gasses. The drive mechanism may be a hydraulic system and is used to tilt the furnace 12 forward, about the axis 62, during charging and processing, and slightly backward during discharge of the material to improve the operational characteristics of the furnace.

The furnace is generally rectangular in cross section with the discharge portion 20 being generally curved along the longitudinal axis of the furnace, and may be, for example in a domed or part spherical shape. The discharge portion has a discharge opening 24 which may conveniently be located at the apex of the curved discharge portion 20, However, the discharge opening may be situated at any suitable location within the discharge portion 20. In addition, the discharge opening 24 may have a closure which can be moved between an open and closed position to open and close the discharge opening.

The furnace 12 conveniently has an inner liner made of any suitable material, such as refractory material, to protect the inner wall of the furnace.

The furnace can also be heated by any suitable means and here is provided with one or more burners 26 capable of burning both virgin fuel (such as natural gas or diesel) and volatile organic compounds which are generated in the furnace 12.

The gases generated in the furnace 12 have an exit path through a ducting 27 to a thermal oxidiser or after burner 28.

The thermal oxidiser 28 is a vertical cylindrical shape structure made of steel and is lined with a refractory material that can withstand high temperatures of typically around 2400° F. The hot gases from the furnace 12 contain VOCs and the thermal oxidiser volume is designed so as to ensure that the VOC-filled gases are retained in the oxidiser for a minimum of 2 seconds residence time. The thermal oxidiser is heated by a multi-fuel burner 30 capable of burning both virgin fuel (such as natural gas or diesel) and the VOC from the furnace 12. The ducting 27 for the VOC gases can also be connected directly to the burner 30 and directly supplies the VOC as an alternative or additional fuel to the burner 30.

The thermal oxidiser 28 has an inlet 31 through which oxygen (typically as atmospheric air) is supplied to assist in combustion of the VOCs in the oxidiser. The air is supplied via a conduit or piping 33 and is fed to the oxidiser 28 by a suitable feed unit such as a fan or blower 35 in the conduit 33. The feed unit 35 is controlled by a process control system 106 which monitors parameters such as the atmospheric temperature, pressure, oxygen content, CO content and content of other selected pollutants in the furnace and controls the feed unit 35 in dependence on one or more of these parameters to ensure that the correct level of oxygen is introduced into the furnace 12.

The gases in the thermal oxidiser 28 have two exit paths. One exit path is through return ducting 32 to provide heating or additional heating to the furnace 12. The second exit path is through a further passage means or ducting in the form of an exit ducting 34 towards an Air Pollution Control (APC) unit 36.

A gas-conditioning unit 38 is connected in the return ducting 32 and is used to condition the gas prior to its reaching the furnace 12. The conditioning unit 38 adjusts the gas temperature via indirect cooling and cleans both the particulates and acids from the gas. The APC may also include a second gas-conditioning unit which adjusts the gas temperature via indirect cooling and cleans both the particulates and acids from the gas. The exit gases travel from the gas-conditioning unit through a baghouse of the APC and then through an ID fan or blower 40 which assists movement of the gases along the ducting 34 and through the APC 36. The gases then exhaust via a chimney to atmosphere.

The return gases passing along the ducting 32 towards the furnace 12 are sampled prior to entering the rotary furnace by a sampling means 42 whilst the outlet gases from the furnace are sampled by a second sampling means 44 in the outlet ducting 27. The two sampling means are sampling systems which generate signals representative of various parameters of the gases such as temperature, oxygen content and carbon monoxide content. These signals are applied to a gas analyser 46. The gas analyser 46 analyses the signals and sends the results to the process control system 106.

Several sensors 108 are installed inside the furnace 12 and send a continuous stream of data to the process control system 106 while the furnace in operation. These sensors are conveniently thermocouples that measure parameters such as the atmospheric temperature, pressure, oxygen content, CO content and content of other selected pollutants in the furnace and generate signals representative of the parameters. This data is continuously logged and the signals sent to the process control system 106. The process control system can also be programmed with the type of material to be processed and adjusts the various operating parameters including the temperature of the return gases, oxygen level and return gas velocity in dependence on the programmed values and/or the received signals. To control the finishing time for the furnace 12 both the return gases entering the furnace and the gases exiting the furnace are monitored in a closed circuit by the gas analyser 46 which records both the oxygen level and the CO level as well as other selected parameters including specified pollutant levels. In addition, the control system 106 can also control the burner 30 to control the temperature in the oxidiser 28.

The process control system controls the processing cycle the end of the operating cycle based on the received signals.

In operation of the furnace 12 the latter is pivoted to a position where the furnace is slightly inclined to the horizontal with the entry point above the horizontal. The position is shown slightly exaggerated in FIG. 4A but it will be appreciated that the angle may be chosen to suit the manner of charging of the furnace and facilitate charging. In this position, the floor of the furnace is at an angle to the horizontal of typically 28° although the angle may be varied within a range typically of 20° to 35° to suit the type of material being entrained into the furnace 12.

The position shown in FIG. 4A is the loading or charging position where the door 22 is opened and the large pieces of scrap material are loaded into the furnace. The angle of inclination of the furnace makes loading of the scrap and other large, heavy materials relatively straight forward.

Figure 5:
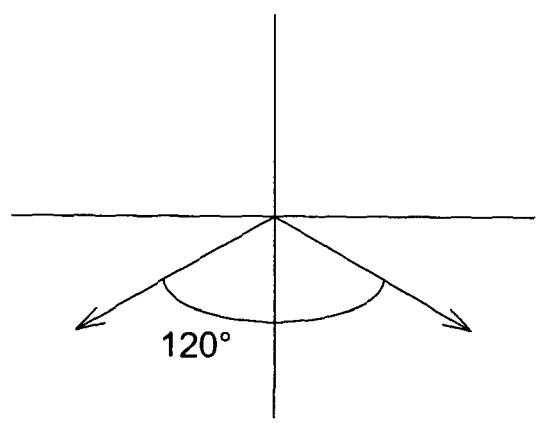
FIG. 5 is a diagrammatic representation of the angle through which the furnace normally pivots during operation.

The door 22 is then closed and the furnace moved through the various positions shown in FIGS. 4B to 4G in order to agitate the scrap in the furnace. The angle through which the furnace may be pivoted can vary but typically it will be pivoted through an angle of 120°. Typically it will be pivoted from a first angular position of 120° to a second angular position of 240° and back, as illustrated in FIG. 5. It will be appreciated that the furnace 12 is pivoted back and forth to a greater or lesser degree and both the speed and repetition of the pivoting as well as the angle through which the furnace is pivoted may be varied.

Figure 2A:
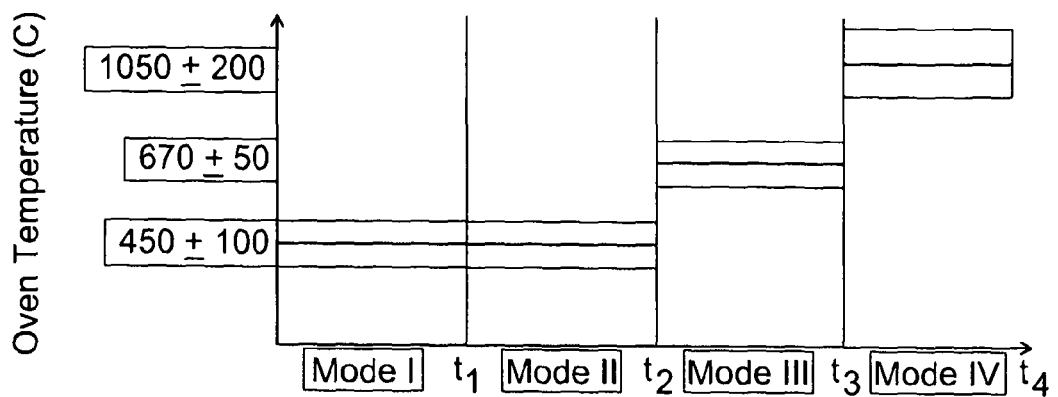
FIG. 2b is a graph showing the variation of the gas recirculation rate with time during the operating modes of the system of FIG. 1.
FIG. 2c is a graph showing the variation of the scrap agitation rate with time during the operating modes of the system of FIG. 1.
FIG. 2d is a graph showing the variation of the oxygen level in the furnace with time during the operating modes of the system of FIG. 1.
Figure 2B:
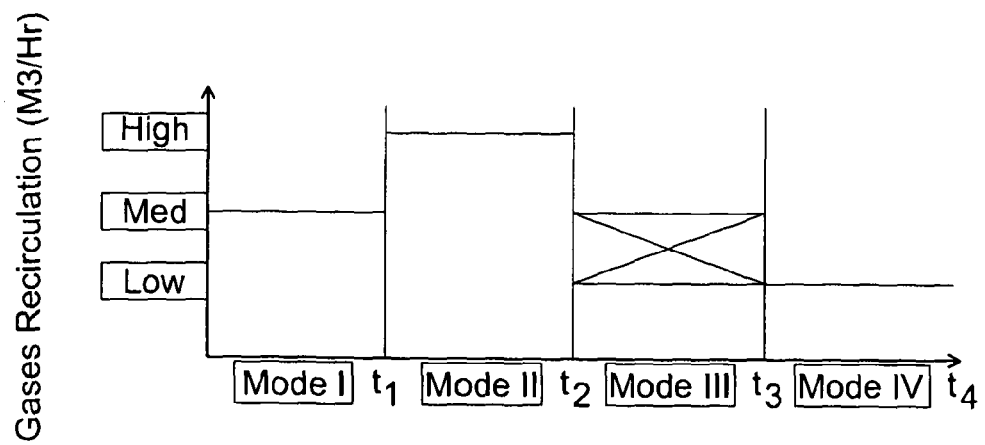
Figure 2C:
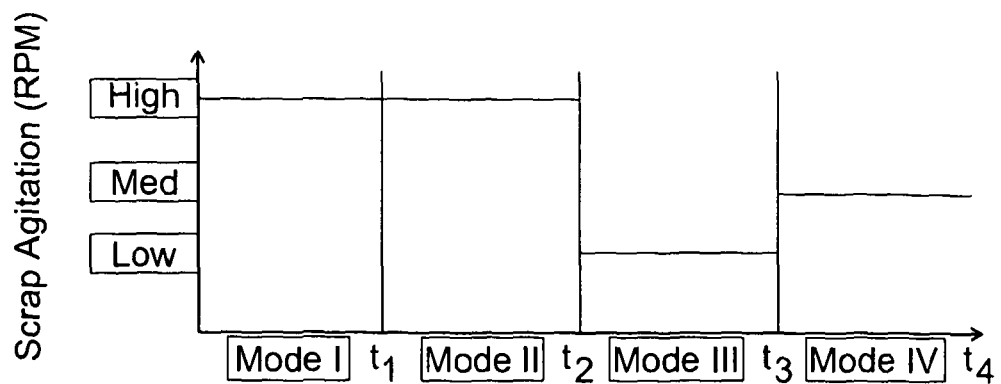
Figure 2D:
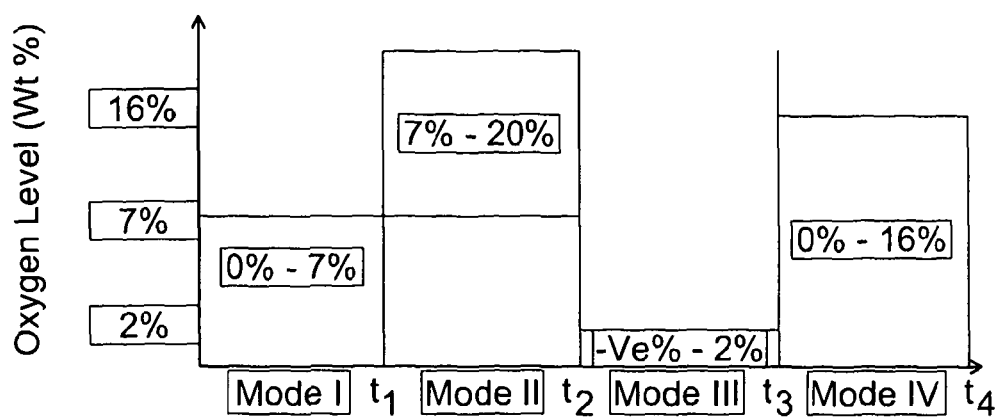

Following charging of the furnace 12, for the first phase or mode of operation of the furnace the main task is to evaporate the water (moisture) and gasify the organics. The temperature of the furnace is therefore maintained preferably in the range 350° C. to 550° C. and preferably at about 450° C., for a first pre-selected time period $t_1$ (FIG. 2a). At this temperature, pollutants such as grease, oil, plastics materials and the like are incinerated and the resulting gases are drawn from the furnace 12 through the conduit 27 to the thermal oxidiser 28. It is important to keep the $O_2$ level at a low gasifying number so that full gasification is achieved. It is possible also to use pure pyrolysis (zero $O_2$) to remove the organics. A reduced $O_2$ level ensures that the organics do not ignite in the furnace 12. Thus, during the first mode the $O_2$ level in the hot gas introduced into the furnace 12 is initially maintained within the range typically 0% to 7%.

A pre-selected level of re-circulation of the hot gas is preferably maintained to ensure all the organics are in contact with the $O_2$. Typically, the recirculation rate is maintained at a medium level for the time period $t_1$. To assist in exposure of the organics in the scrap to oxygen the scrap is agitated within the furnace by the pivotal movement of the furnace through the various positions shown in FIGS. 4B to 4G. The agitation is maintained preferably at a high level for the whole of the time period $t_1$.

The removal of oil and grease from the scrap reduces the tendency for particulates to stick together and thus makes removal of the particulates in the second mode of operation easier. In the second mode of the process the particulates (dust, sand, etc.) are removed and the balance of the carbon particles in the processing chamber is oxidised and removed to the air pollution control unit 36. During this mode of the operation (preselected time period $t_1$ to $t_2$) the temperature of the gas is maintained at a low level, typically its mode 1 temperature, below the melting or the oxidising temperature of the aluminium. The scrap agitation is also maintained at a high level, typically its mode 1 level, to ensure all the particulate is shaken up from the scrap and entrained into the gases. However, the gas recirculation flow rate is raised to a high level and the $O_2$ level is increased to a level in the range 7% to 20% to oxidise the carbon.

Figure 3:
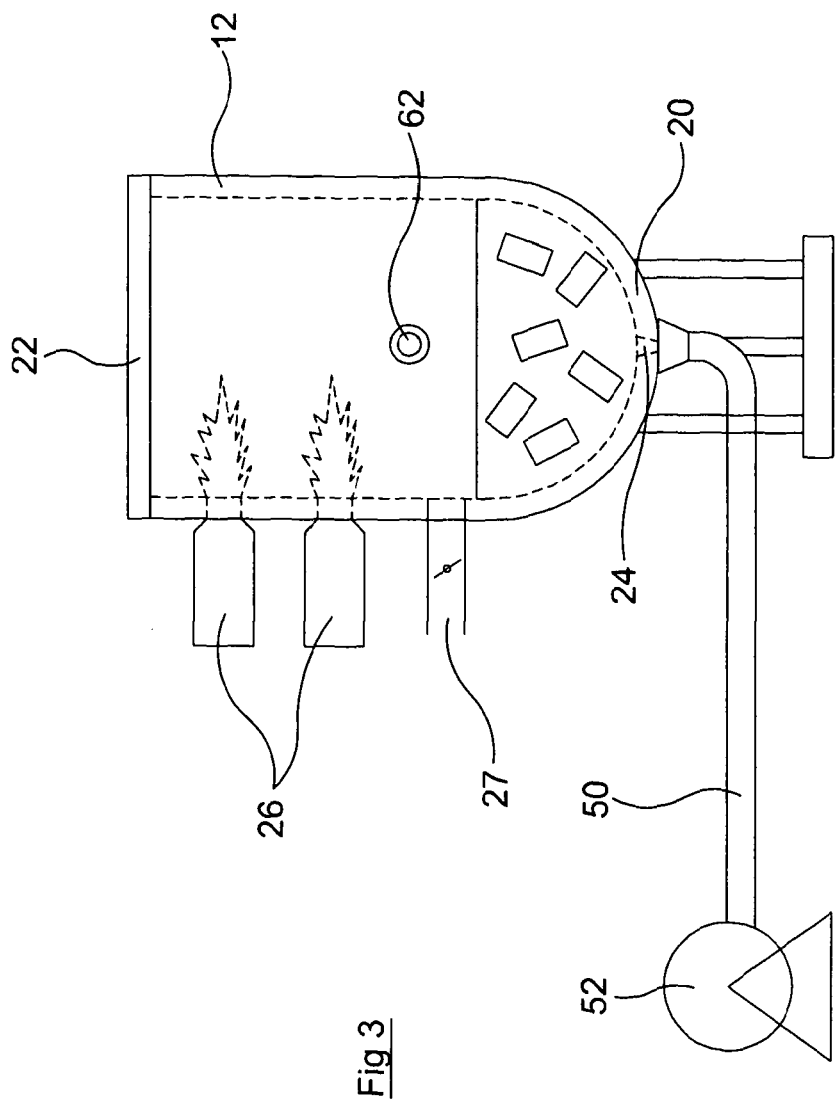
FIG. 3 is a side elevation of the furnace of FIG. 1 in a vertical attitude for discharge of material.

In this mode the furnace is generally tilted vertically in the attitude shown in FIG. 3, whilst it is being shaken or pivoted backwards and forwards. This causes all the particulates to flow under the action of gravity through the scrap into the discharge opening 24 leading to the conduit 50 and the APC 36. Gas is also blown into the furnace 12 to clean the furnace of particulates such as dust and sand residues. The gas may be blown into or sucked through the furnace through any suitable gas port to exit through conduit 50 to carry the dust and sand to the APC 36 either directly or via conduit 34.

During the second mode the temperature of the furnace is too low to melt the aluminium in the scrap and therefore the dust and sand can be carried by the gases through the discharge opening 24. The conduit 50 preferably has an ID fan or blower 52 which assists movement of the gases, sand, and dust along the ducting 50.

During the third mode of the operating process (preselected time period $t_2$ to $t_3$) the aluminium in the scrap is melted by raising the temperature in the oven 12 to a temperature above the aluminium melting point. Here, the furnace temperature is raised to a level in the range about 620° C. to 720° C., typically about 670° C., and is held at or around this temperature for the preselected time period $t_2$ to $t_3$ to melt the aluminium. The oxygen level in this mode is reduced to a very low level (typically in the range 0% to 2%, preferably about 2% and possibly even in a reduced atmosphere <0%) to minimise the formation of dross during this critical mode. Agitation of the furnace 12 may continue with the discharge opening 24 closed. The scrap agitation is kept at a low level, to ensure that the molten aluminium is not mixed with iron components of the scrap, resulting in a coating of the iron components. If coating occurs then that aluminium may be lost to the recovery process. Once the aluminium is molten, the furnace is moved to the position shown in FIG. 4D, the discharge opening is opened and the aluminium flows under gravity out into a suitable receptacle. The removal of the particulates in the second mode of the process ensures that the molten aluminium does not entrain particulate and sand which would cause dross formation and loss of aluminium. The gases are recirculated at a suitable level to maintain the required furnace range of 620° C.-720° C. and may fluctuate between low and medium as required.

Once the aluminium has been removed, the temperature within the furnace is raised to a high level, typically in the range 850° C. to 1250° which is above the annealing temperature of the ferrous material in the scrap which loses its hardened nature and becomes brittle. The temperature is held at or around this level for a preselected time period ($t_3$ to $t_4$) to ensure the ferrous components are fully exposed to this very high temperature. Once the steel has become brittle, crushing of the scrap at a later stage is facilitated. Agitation of the scrap is at a medium level during this mode and the recirculation of the gases is typically at a low level but may fluctuate between a low and medium level as required to maintain the required range of temperature in the furnace 12.

The furnace is then pivoted into the position shown in FIG. 4G, and may even be tilted further backwards in a clockwise direction as seen in FIG. 4G, and the door 22 is opened to enable the remaining material to be discharged from the furnace.

The invention claimed is:
1. A method of reclaiming aluminum from scrap material, the method comprising:
   loading said scrap into a tiltable furnace(12);
   operating said furnace (12) in a first mode by heating said scrap in said furnace at a first temperature in the range of 350° C. to 550° C. to drive off Volatile Organic Compounds without melting the aluminum;
   operating said furnace (12) in a second mode to remove particulate material from said furnace;

operating said furnace in a third mode by raising the temperature of the furnace (12) to melt said aluminum; and
tilting said furnace (12) to remove molten aluminum through a discharge port (24).

2. A method as claimed in claim 1 further comprising maintaining an oxygen level in said furnace in the first mode in a range 0% to 7% by volume.

3. A method as claimed in claim 1 further comprising maintaining an oxygen level in said furnace in said second mode in a range 7% to 20% by volume.

4. A method as clamed as in claim 1 further comprising maintaining the temperature in said furnace in said third mode in a range 570° C. to 770° C.

5. A method as claimed is claim 1 further comprising maintaining an oxygen level in said furnace in said third mode in a range 0% to 2% by volume.

6. A method as claimed in claim 1 further comprising operating said furnace (12) in a conditioning mode after removal of said aluminum to thermally condition metal remaining in the furnace.

7. A method as claim in claim 6 further comprising maintaining the temperature in said furnace in said conditioning mode in a range 850° C. to 1250° C.

8. A method as claimed in claim 6 or 7 further comprising maintaining the oxygen level in said furnace in said conditioning mode in a range 0% to 16% by volume.

9. A method as claimed in claim 6 further comprising:
agitating said furnace at a first level in said first and/or second mode, wherein said first level comprises tilting the furnace (12) back and forth at a first rate and/or through a first angle;
agitating said furnace at a lower level in said third mode, wherein said second lower level comprises tilting the furnace (12) back and forth at a second rater lower than said first rate and/or through a second angle less than said first angle; and
agitating said furnace at a intermediate level in said conditioning mode, wherein said intermediate level comprises tilting the furnace (12) back and forth at a third rate between said first and second rate and/or through a third angle between said first and second angle.

10. A method as claimed in claim 6 further comprising processing raw Volatile Organic Compound in a thermal oxidizer (28) and returning processed, heated gases from said thermal oxidizer to said furnace to assist heating the furnace, recirculating said processed gases at a first flow rate in said first mode and recirculating said processed gases at a flow rate lower than said first flow rate in said conditioning mode.

11. a method as claimed in claim 1 further comprising titling the furnace (12) back and forth to agitate the scrap.

12. A method as claimed in claim 11 further comprising agitating said furnace at a first level in said first mode, wherein said first level comprises tilting the furnace (12) back and forth at a first rate and/or through a first angle.

13. A method as claimed is claim 11 or 12 further comprising agitating said furnace at a first level in said second mode, wherein said first level comprises tilting the furnace (12) back and forth at a first rate and/or through a first angle.

14. A method as claimed in claim 12 further comprising agitating said furnace at a second lower level in said third mode, wherein said second lower level comprising tilting the furnace (12) back and forth at a second rate lower than said first rate and/or through a second angle less than said first angle.

15. A method as claimed in claim 1 further comprising processing raw Volatile Organic Compounds in a thermal oxidizer (28) and returning processed, heated gases from said thermal oxidizer to said furnace to assist heating the furnace.

16. A method as claimed in claim 15 further comprising recirculating said processed gases at a first flow rate of said first mode.

17. A method as claimed in claim 16 further comprising recirculating said processed gases at a second flow rate, higher than said first rate, in said second mode.

18. A method as claimed in claim 15 further comprising recirculating said processed gases at a rate third flow rate lower than said flow rate in said third mode.

19. A method as claimed in claim 15 wherein Volatile Organic Compounds from said furnace (12) are fed to said thermal oxidizer as a fuel source.

20. A method as claimed in claim 15 further comprising performing one or more of the operations on said processed gases selected from the group comprising: cooling said heated gas, cleaning said heated gas of particulates, and cleaning said heated gas of acid.

21. A method as claimed in claim 15 further comprising monitoring a composition of gas provided from said furnace to said thermal oxidizer (28) and a composition of gas returned form said thermal oxidizer (28) to said furnace, and controlling a finish time of one or more of operating modes selected from a group comprising: said first mode, said second mode, said third mode and said conditioning mode, in dependence on said monitored gases.

22. A method as claimed in claim 1 further comprising cleaning said furnace by flowing gas through said furnace (12) prior to operation in said third mode of operation to clean said furnace of particulates.

23. A method as claimed in claim 22 further comprising capturing particulates entrained in gas exiting said furnace (12) during said cleaning of said furnace.

24. A method as claimed is claim 1 comprising tilting said furnace for performing one of more of operations selected from a group comprising: loading, discharge and agitation of the furnace.

25. A method as claimed in claim 1 wherein said scrap includes a first metal melting at a second temperature and a second metal unmelted at said second temperature, and the method further comprising operating said furnace at said third mode in which said furnace (12) is operated at a third temperature, higher than said second temperature, after melting and reclaiming said first metal, to thermally condition the second metal thereby to facilitate crushing of said second metal.

* * * * *